(12) United States Patent
Faruque et al.

(10) Patent No.: US 9,475,366 B2
(45) Date of Patent: Oct. 25, 2016

(54) DOOR INTRUSION RESISTANCE APPARATUS FOR A VEHICLE

(71) Applicant: Ford Global Technologies, LLC, Dearborn, MI (US)

(72) Inventors: Mohammed Omar Faruque, Ann Arbor, MI (US); Michael M. Azzouz, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/592,009

(22) Filed: Jan. 8, 2015

(65) Prior Publication Data

US 2015/0123427 A1     May 7, 2015

Related U.S. Application Data

(63) Continuation-in-part of application No. 14/027,564, filed on Sep. 16, 2013, now abandoned.

(51) Int. Cl.
*B60J 5/04* (2006.01)
*B62D 25/02* (2006.01)

(52) U.S. Cl.
CPC ............. *B60J 5/0458* (2013.01); *B60J 5/0461* (2013.01); *B62D 25/025* (2013.01)

(58) Field of Classification Search
CPC ........ B60J 5/04; B60J 5/0412; B60J 5/0413; B60J 5/042; B60J 5/0427; B60J 5/0456; B60J 5/0458; B62D 25/025
USPC ........... 296/1.04, 146.1, 146.5, 146.6, 146.9, 296/187.03, 187.12, 209
See application file for complete search history.

(56) References Cited

U.S. PATENT DOCUMENTS

| | | | |
|---|---|---|---|
| 4,307,911 A | 12/1981 | Pavlik | |
| 4,462,633 A * | 7/1984 | Maeda ................ | B62D 25/025 296/146.6 |
| 4,488,751 A | 12/1984 | Kling | |
| 4,915,442 A * | 4/1990 | Garnweidner ......... | B60J 5/0441 296/146.6 |
| 5,029,934 A * | 7/1991 | Schrader ............... | B60J 5/0458 296/146.1 |
| 5,364,157 A | 11/1994 | Siedlecki | |
| 6,659,537 B2 | 12/2003 | Moriyama et al. | |
| 6,749,253 B1 | 6/2004 | Zummallen et al. | |
| 7,311,169 B1 | 12/2007 | Caliskan et al. | |
| 8,371,640 B2 | 2/2013 | Horneck et al. | |
| 8,517,450 B2 | 8/2013 | Lange | |
| 2005/0127715 A1 | 6/2005 | Carre | |
| 2006/0000145 A1 | 1/2006 | Yoshida et al. | |
| 2011/0291442 A1* | 12/2011 | Oirschot ............... | B60J 5/0458 296/187.12 |

FOREIGN PATENT DOCUMENTS

DE    102006015874 A1 * 10/2007  ............ B60J 5/0427
DE    102007039803 A1    2/2009

* cited by examiner

*Primary Examiner* — Jason S Daniels
(74) *Attorney, Agent, or Firm* — Jason Rogers; Brooks Kushman, P.C.

(57) ABSTRACT

A door intrusion apparatus for a vehicle having a door and a rocker with a vertically extending wall defining a catcher opening. The apparatus includes a projection horizontally extending from the door and a projection trap attached to the vertically extending wall inside the rocker and below the catcher opening. In a side impact collision, the projection trap engages the projection thereby minimizing the door from intruding into a vehicle cabin.

15 Claims, 7 Drawing Sheets

DOOR INTRUSION RESISTANCE APPARATUS FOR A VEHICLE

CROSS-REFERENCE TO RELATED APPLICATIONS

This application is a continuation-in-part of U.S. patent application Ser. No. 14/027,564 filed Sep. 16, 2013.

TECHNICAL FIELD

The present disclosure relates to safety features for vehicles, and in particular features that mitigate body side intrusions in side impact collisions.

BACKGROUND

A vehicle door may consist of an outer panel facing the exterior of the vehicle and an inner panel facing the cabin of the vehicle. The inner panel includes a lower wall that faces a rocker assembly. In a side impact collision, vehicle doors may collapse inwardly and intrude into the cabin of the vehicle. Excessive door intrusion may adversely affect deployment of a side air bag due to the reduced gap between the door and the occupant.

Some safety structures may attempt to minimize the door intrusion into the cabin from a side impact collision. Such a structure is disclosed in U.S. Pat. No. 4,462,633. U.S. Pat. No. 4,462,633 discloses a box shaped reinforcing member mounted on a vehicle floor that extends above the side sill or rocker panel. A bracket mounted to the door has a portion engaging the reinforcing member when the door is closed. In a side impact collision, the bracket engages the reinforcing member to inhibit inward movement of the door. The box shaped reinforcing member is visible to an occupant, especially when the door is open. An occupant must step over the rocker panel when entering or exiting the vehicle. A box shaped reinforcing member that is disposed above the rocker panel interferes with the ingress and egress of the occupant. Placing a box shaped reinforcing member above the rocker panel also limits design freedom. The receiver must be of a limited size to reduce interference with the ingress and egress of the occupant.

The above problems and other problems are addressed by this disclosure as summarized below.

SUMMARY

One aspect of the present disclosure relates to a vehicle that includes a door, a projection horizontally extending from the door, and a rocker that is adjacent to the door and that has a vertically extending wall defining a catcher opening. When the door is in a closed position, the projection inserts in the catcher opening. The vehicle further includes an engaging means for engaging the projection in a side impact collision to prevent the door from substantially intruding into a vehicle cabin.

The engaging means may be a hook or a tang. The engaging means may include an upright portion attached to the vertically extending wall and a plurality of curved portions that are spaced from the vertically extending wall and that extend from the upright portion. The curved portion may be C-shaped. The projection includes a plurality of legs and a cross-piece in between the legs and wherein in a side impact collision, the legs and the cross-piece encompass the engaging means. The vehicle may further include a reinforcement panel attached to the vertically extending wall.

The engaging means may be attached to the vertically extending wall through the reinforcement panel.

Another aspect of the present disclosure relates to a door intrusion apparatus for a vehicle having a door and a rocker with a vertically extending wall defining a catcher opening. The apparatus includes a projection horizontally extending from the door and a projection trap attached to the vertically extending wall inside the rocker and below the catcher opening. In a side impact collision, the projection trap engages or hooks the projection to minimize intrusion of the door into a vehicle cabin. The projection trap may be in a form of a hook or a tang. The projection trap may include an upright portion attached to the vertically extending wall and a plurality of curved portions that are spaced from the vertically extending wall and that extend from the upright portion.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
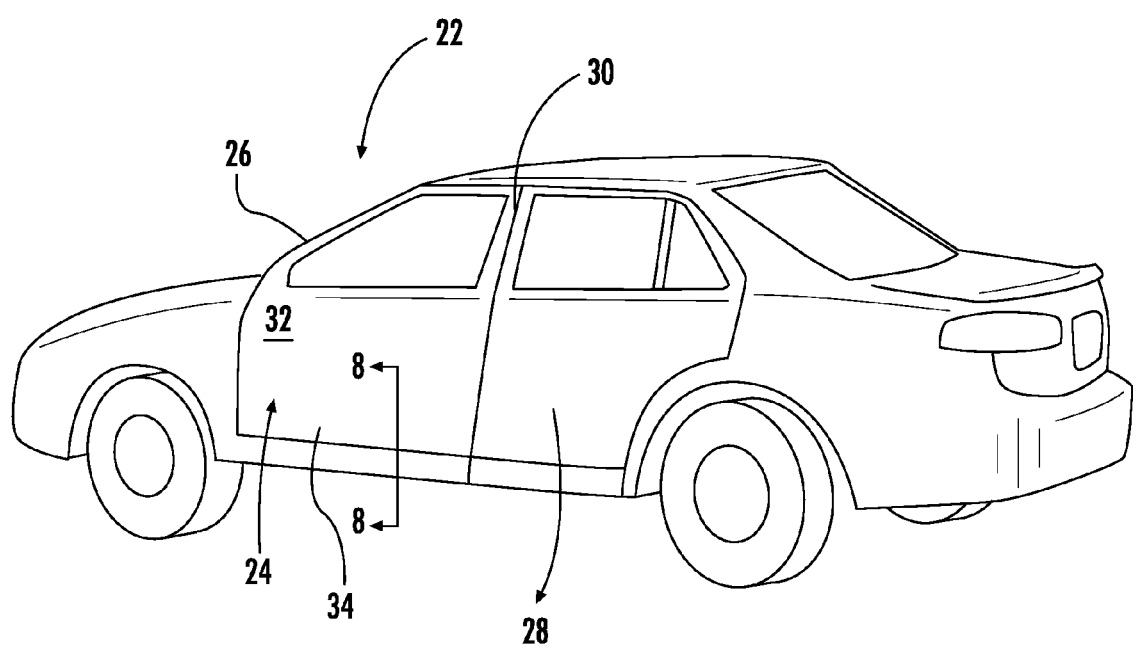
FIG. 1 is a perspective view of a vehicle incorporating a door intrusion resistance apparatus of the present disclosure.

Referring to FIG. 1, a vehicle 22 incorporating the door intrusion resistance apparatus includes a front door 24 attached to a vehicle body adjacent to the A-pillar 26. The vehicle 22 also includes a rear door 28 attached to the vehicle body near the B-pillar 30. Door 24 includes an upper outer portion 32 and a lower outer portion 34. The door intrusion resistance apparatus may be incorporated in any of the doors of the vehicle 22.

Figure 2A:
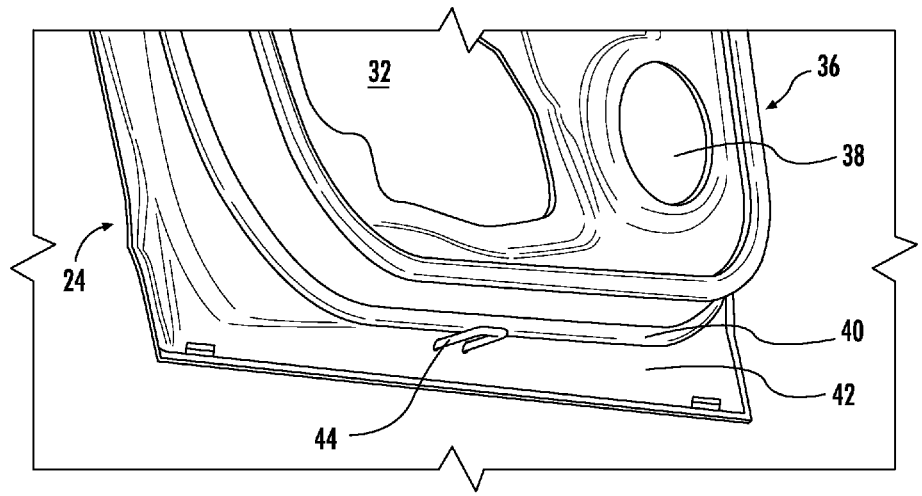
FIG. 2A is a partial perspective view of a lower inner portion of a front door illustrating a projection.

Referring to FIG. 2A, door 24 includes an upper inner portion 36 and an upper outer portion 32. In between the upper inner portion 36 and the upper outer portion 32 is a cavity 38 where vehicle accessories may be mounted, such as those for opening and closing the doors and windows, for defrosting the windows, and audio speakers. The accessories may be covered by a door trim or an interior trim panel that may be another inboard side panel mounted to the upper inner portion. Door 24 also includes a lower inner portion 42 disposed below the upper inner portion 36. The upper inner portion 36 may have an overhang or an offset surface from the lower inner portion 42 to encapsulate the accessories within the cavity formed by the upper inner portion 36 and the upper outer portion 32. A door seal 40 is attached between the upper inner portion and the lower inner portion. When the door 24 is in a closed position, the lower inner 42 is not visible to an occupant of the vehicle.

Figure 2B:
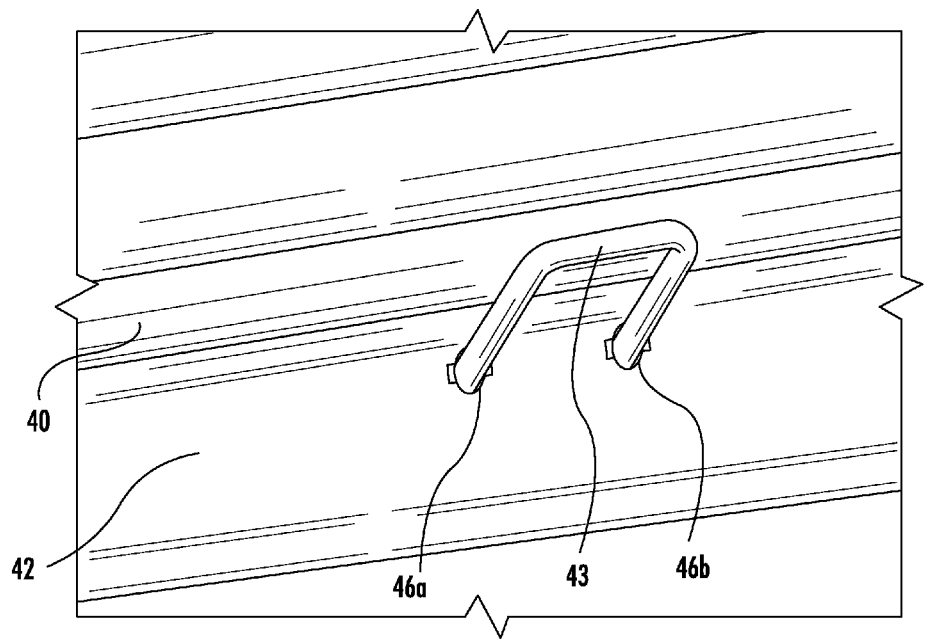
FIG. 2B is a close up view of FIG. 2A showing the projection extending through the inner door.

The door intrusion resistance apparatus includes a projection 44 connected to the lower inner portion 42 that extends or protrudes substantially horizontally from the lower inner portion 42. Thus, the term "protrusion" may also sometimes be used to refer to the projection 44. Referring to FIG. 2B, the projection 44 may be disposed at a slight angle relative to the lower inner portion 42. The projection 44 is positioned below the door seal 40 and is in a form of a loop or a U-shaped member. Projection 44 includes a pair of parallel legs 46a and 46b that extend through the lower inner 42, and a cross-piece 43 is attached to the distal ends of the legs 46a and 46b.

Figure 3A:
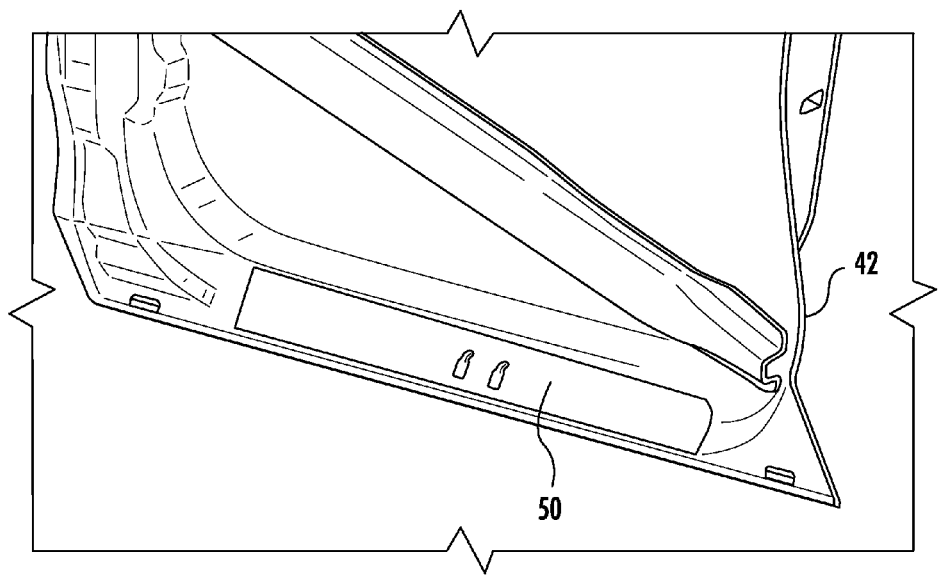
FIG. 3A is a partial perspective view of the opposite side of the lower inner portion of FIG. 2A illustrating a reinforcement panel attached to the lower inner portion.

Referring to FIG. 3A, legs 46a and 46b extend through holes that are formed on the lower inner portion 42 and on a reinforcement panel 50 attached to the lower inner 42. The reinforcement panel 50 may be made of steel and adds supporting structure that provides rigidity to the lower inner portion so that the projection 44 is not easily detached from the lower inner portion. In addition, the reinforcement panel 50 is adapted to resist crumpling of the lower inner portion in a side impact collision.

Figure 3B:
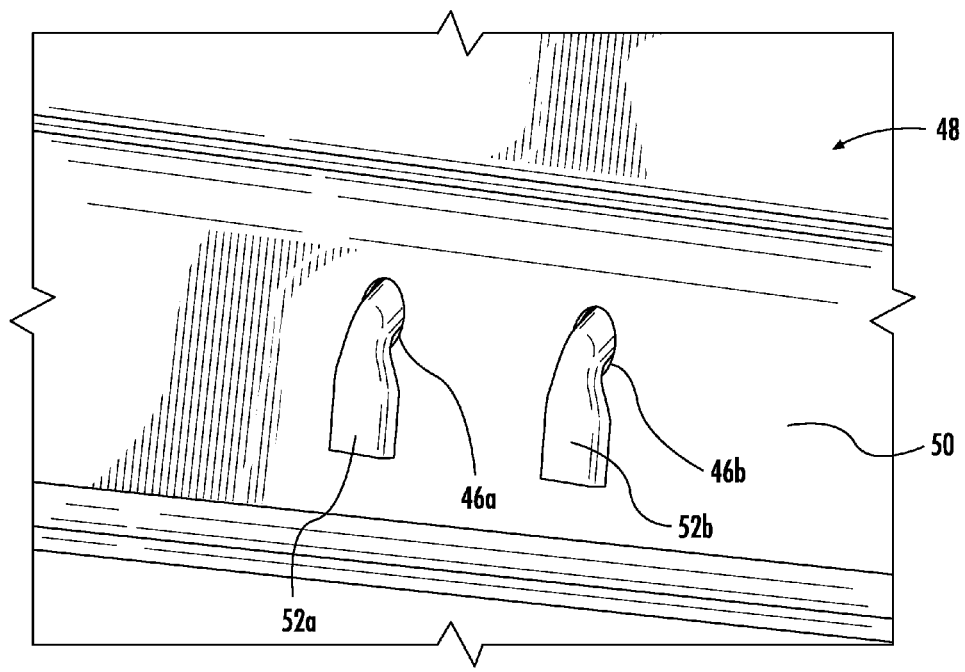
FIG. 3B is a close up view of FIG. 3A illustrating the legs of the projection with feet that anchor the projection to the door.

Referring to FIG. 3B, a first foot 52a is preferably connected to leg 46a, and a second foot 52b is connected to leg 46b. The first foot 52a and the second foot 52b are substantially perpendicularly connected to their respective legs. The first foot 52a and the second foot 52b abut the door reinforcement panel 50 to attach and secure the projection 44 to the lower door panel. The feet may also be flattened at their ends to enhance the attachment of the projection 44 to the lower door panel. The projection 44 is attached to the lower inner portion 42 and is not visible to an occupant of the vehicle when the door 24 is closed. This location of the projection 44 provides flexibility in designing and determining the size of the projection 44 because it does not negatively impact the appearance of the door.

Figure 4:
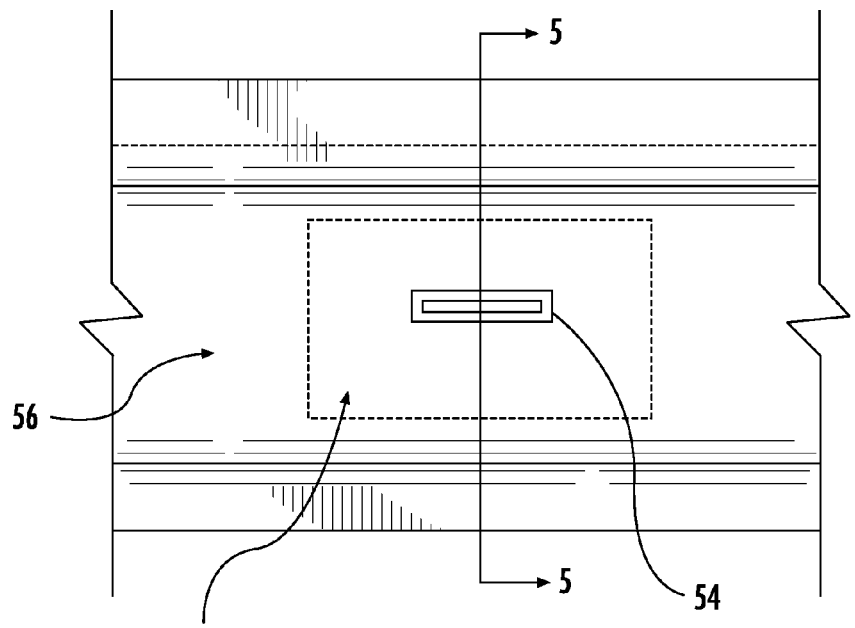
FIG. 4 is a partial side elevation view of the rocker panel illustrating the catcher opening provided on the rocker.
Figure 5:
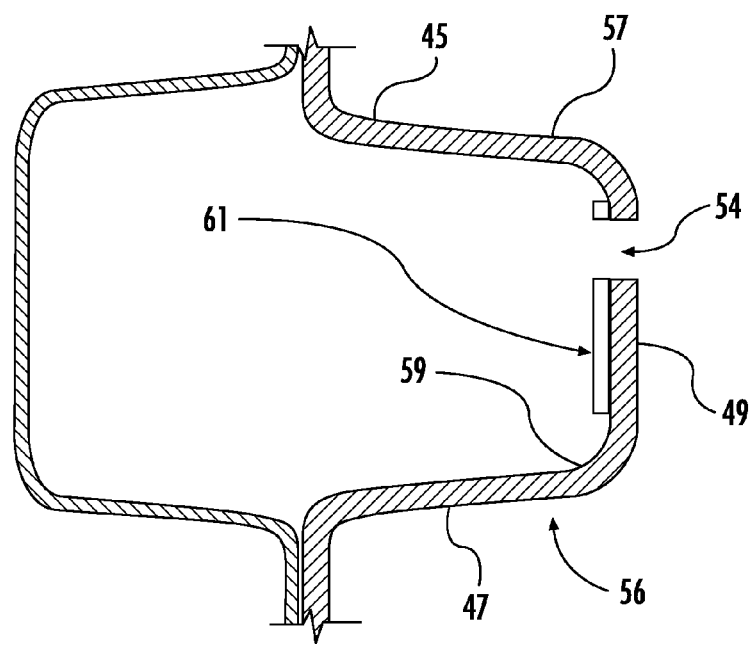
FIG. 5 is a cross-sectional view of the rocker panel taken along the lines 5-5 in FIG. 4.

The term "rocker assembly" may be interchanged with the term "rocker" to refer to a portion of the body paneling of a vehicle that is situated below the doorsills of the vehicle. Referring to FIGS. 4-5, a rocker assembly 56 includes an outer wall 57. The outer wall 57 includes a top wall 45, a bottom wall 47 that is positioned below the top wall 45, and a vertically extending wall 49 connected to the top wall 45 and the bottom wall 47. The top wall 45 may provide a door threshold for the vehicle and may be substantially horizontal. In certain embodiments, it is parallel with a vehicle floor. The bottom wall 47 serves as the base of the vehicle body and is a part of the periphery of the vehicle body. The vertically extending wall 49 contacts the lower inner portion 42 of the door 24 when the door is in a closed position.

The rocker assembly 56 also includes an inner wall 59 opposite the outer wall 57. The rocker assembly 56 includes a door reinforcement panel 61 attached to the inner wall 59. The door reinforcement panel 61 may be made of steel. The door intrusion resistance apparatus of the present disclosure includes a catcher opening 54 that is formed as an opening on the rocker assembly 56 and a reinforcement panel 61 attached to the inner wall 59 of the rocker assembly 56. More specifically, the catcher opening 54 is formed on the vertically extending wall 49 of the rocker assembly 56. The catcher opening 54 is shaped to receive the projection 44. For instance, the catcher opening 54 may be elliptical in shape and may have a semi-major axis diameter that is larger than the width of the cross-piece 43 of the projection 44. The catcher opening 54 may also be a rectangular opening that has a length that is larger than the width of the cross-piece 43 of the projection 44.

Figure 6:
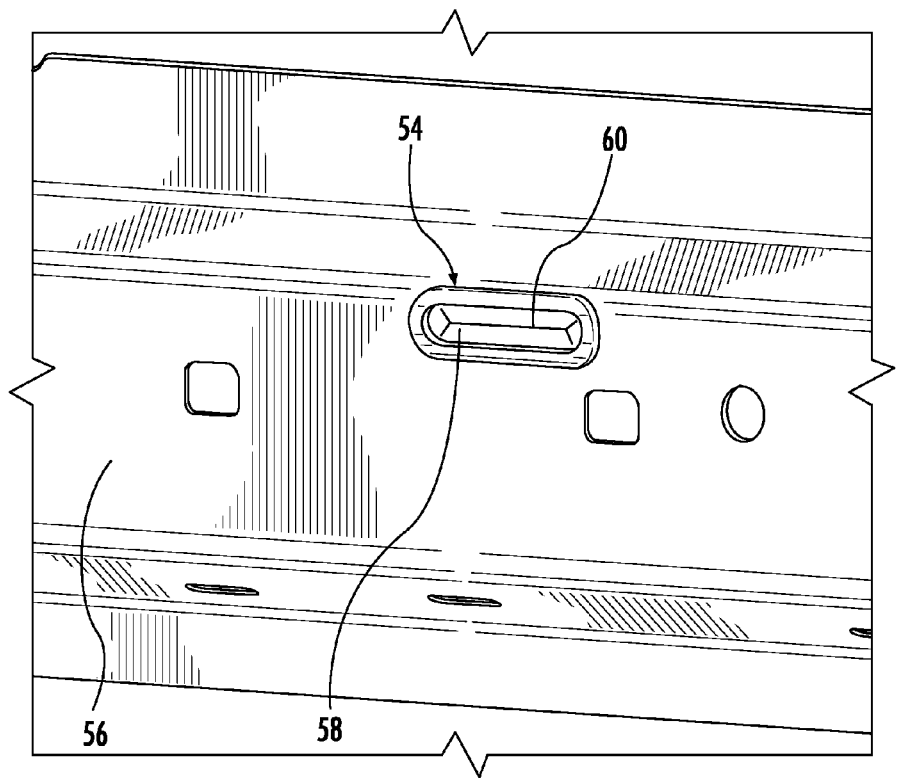
FIG. 6 is a partial perspective view of the rocker panel illustrating the catcher opening provided on the rocker and the grommet covering the catcher opening.

Referring to FIG. 6, a grommet 58, such as those made of rubber material, may be positioned around the opening of the catcher opening 54 to seal the catcher opening and minimize water intrusion to the catcher opening 54. The grommet 58 defines a slit 60 extending substantially throughout the length of the catcher opening 54 to receive the projection 44. The slit 60 may be single-lined slit across the middle of the catcher opening that diverges into a V-shaped slit at both ends.

Figure 7:
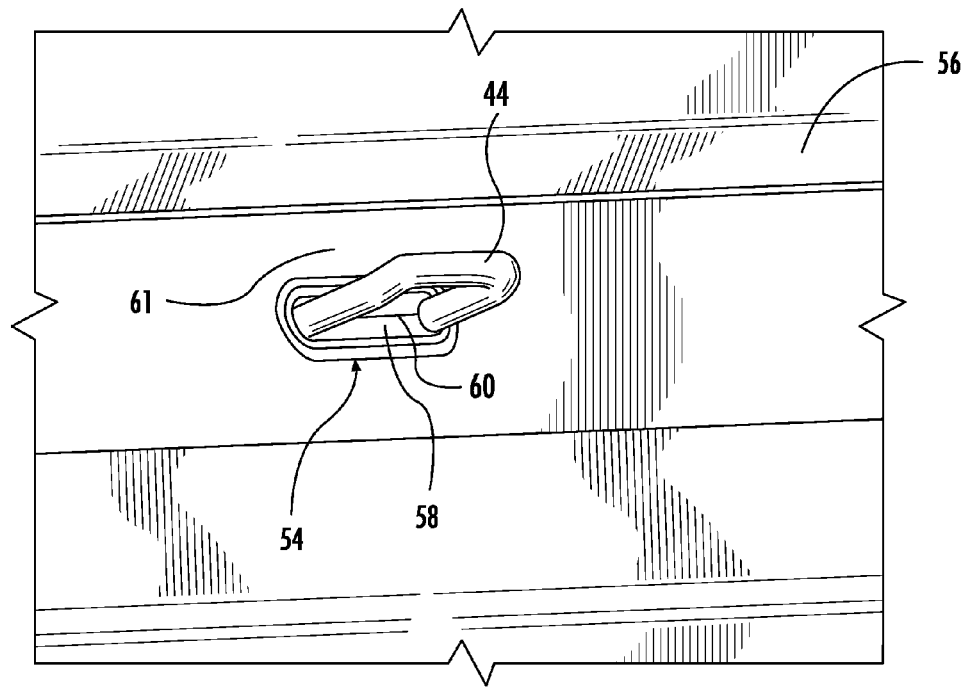
FIG. 7 is a partial perspective view of the rocker panel of FIG. 6 with the projection extending through the catcher opening.

Referring to FIG. 7, when the door is closed, a portion of the projection 44 is inserted through the slit 60 of the grommet 58, the catcher opening 54, and the reinforcement panel 61 that is attached to the inner wall 59 of the rocker assembly 56.

Figure 8:
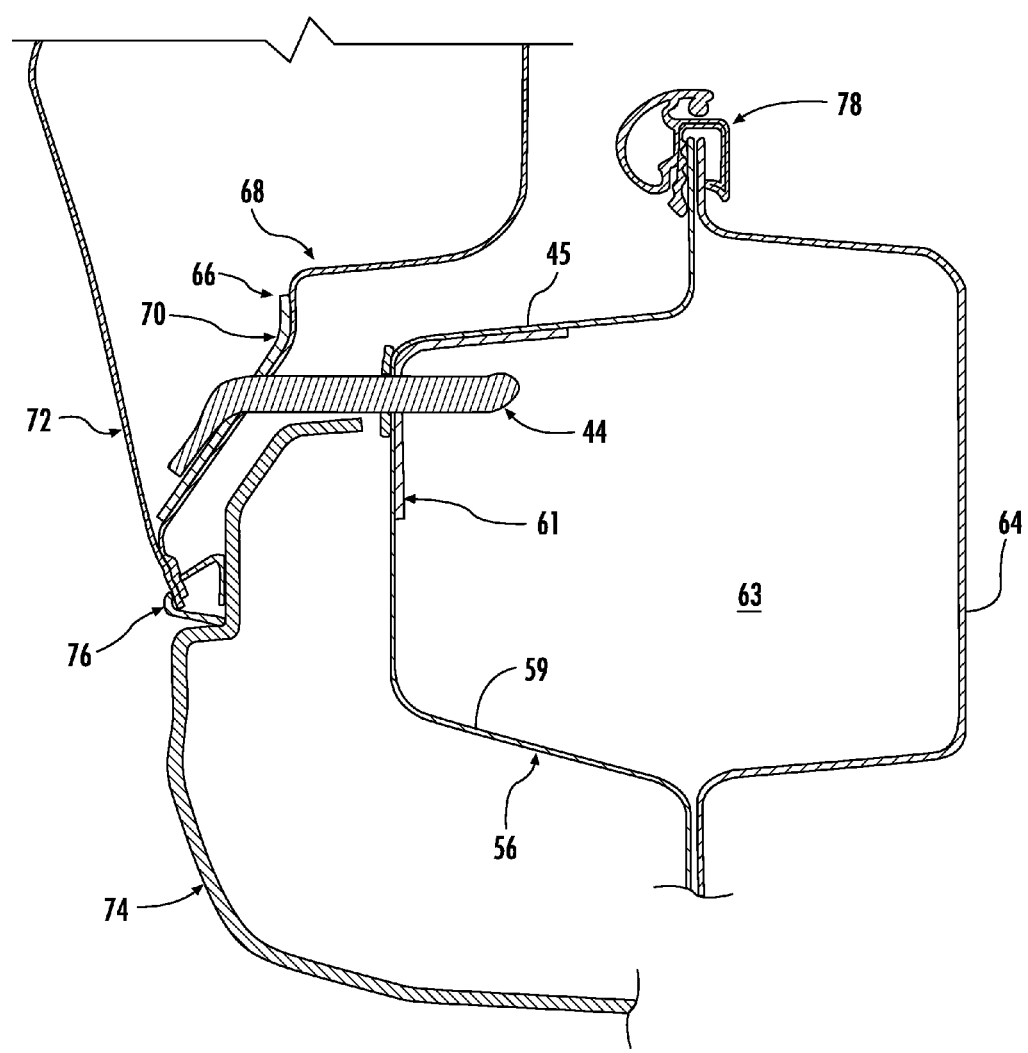
FIG. 8 is a cross-sectional view taken along the line 8-8 in FIG. 1 showing the door intrusion resistance apparatus.

Referring to FIG. 8, a portion of the projection 44 is preferably received in a cavity 63 that is formed by the rocker assembly 56 and a floor side inner portion 64 of a vehicle. The rocker assembly 56 includes an inner wall 59 where the reinforcement panel 61 is attached. The reinforcement panel 61 may be attached to an area of the inner wall 59 that defines the catcher opening 54. The projection 44 of the door intrusion resistance apparatus of the present disclosure is attached to an inner panel of the door. More specifically, the lower inner portion 66 is disposed below the upper inner portion 68. The lower inner portion 66 serves as a rocker engaging portion that faces the rocker. When the door is in a closed position, the upper inner portion 68 is disposed on the top wall 45 of the rocker assembly 56. The upper inner portion 68 may contact a primary door seal 78 that is attached at the boundary of the rocker assembly 56 and the floor side inner portion 64. The lower inner portion 66 is reinforced by an inner reinforcement panel 70 attached to an area of the lower inner portion where the projection 44 is attached.

As shown in FIG. 5, the projection 44 is attached to the inner panel portion opposite the outer panel portion 72. The projection 44 is attached is above a rocker molding 74 at the lower inner portion 66. A secondary door seal 76 may be provided at the boundary of the lower inner portion 66 and the rocker molding 74. A portion of the projection is received in the catcher opening and is positioned within the catcher opening cavity defined by the rocker assembly and the floor inner portion when the door is closed. Movement of the door towards the cabin of the vehicle (door intrusion) is inhibited or at least minimized in a side impact collision because the projection and the catcher opening hold the door in engagement with the rocker assembly.

Figure 9:
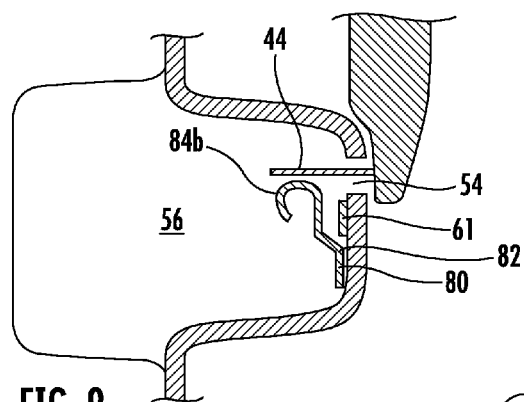
FIG. 9 is a cross-sectional view similar to FIG. 8 showing another embodiment of a door intrusion resistance apparatus that includes a hook inside the rocker below the catcher opening.
Figure 10:
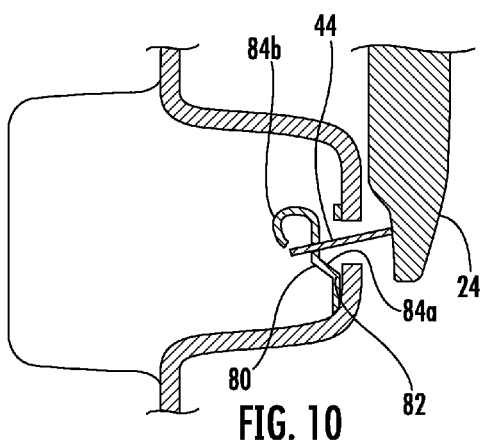
FIG. 10 is a cross-sectional view similar to FIG. 8 of the door intrusion resistance apparatus embodiment of FIG. 9 showing the projection engaging the hook.

Referring to FIGS. 9-12, the door intrusion resistance apparatus shown in FIGS. 2-8 may be modified by adding a projection trap or a projection engaging means for engaging the projection in a side impact collision to prevent the door from substantially intruding into a vehicle cabin. As shown in FIGS. 9 and 10, the projection engaging means may be a hook 80 that is positioned within the cavity of the rocker assembly 56. The hook is attached to the vertically extending inner wall adjacent to and below the catcher opening 54. The hook 80 may also be attached to the reinforcement panel 61. The hook 80 extends vertically upward such that it is normally positioned adjacent and below the projection 44 when the projection 44 is inserted into the rocker through the catcher opening 54. The hook 80 has an upright portion 82 directly attached to the vertically extending wall and a plurality of curved portions 84a and 84b that are spaced from the vertically extending wall and that extend from the upright portion 82. Curve portion 84b is C-shaped and is adapted to engage the projection 44 during a side impact collision. As shown in FIG. 10, the projection 44 may deflect downwardly over the hook 80, or the hook 80 may move upwardly to be inserted into the projection 44. In a typical side impact scenario the door outer bends in-board forcing the door bottom to outboard. This forces the projection 44 to rotate down as shown in FIG. 10. In a side impact collision, the hook minimizes intrusion of the door 24 towards the vehicle cabin depending on the effect of the collision. Legs 46a and 46b of the projection 44 and cross-piece 43 encompass the hook 80 thereby engaging the projection 44 with the hook 80 to control the door 24.

Figure 11:
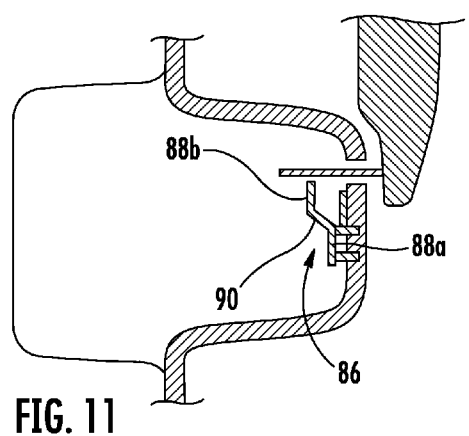
FIG. 11 is a cross-sectional view similar to FIG. 8 showing yet another embodiment of a door intrusion resistance apparatus that includes a tang inside the rocker below the catcher opening.
Figure 12:
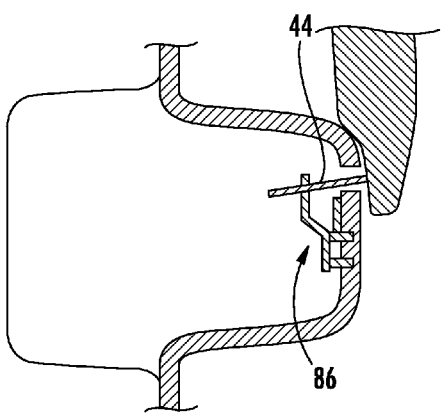
FIG. 12 is a cross-sectional view similar to FIG. 8 of the door intrusion resistance apparatus embodiment of FIG. 11 showing the projection engaging the tang.

Referring to FIGS. 11 and 12, the projection engaging means may be in a form of a tang 86. Tang 86 has a first upright portion 88a attached to the vertically extending wall of the rocker, a curved portion 90 spaced from the vertically extending wall, and a second upright portion 88b extending from the curved portion 90. The second upright portion 88b is normally positioned adjacent and below the projection 44 that is inserted into the rocker through the catcher opening 54. As the door or the rocker deforms in a side impact collision, the projection 44 moves downwards and over the second upright portion 88b with legs 46a and 46b and cross-piece 43 encompassing the second upright portion 88b of the tang 86. Alternatively, the second upright portion 88b of the tang 86 moves upward and inserts into the projection to control the door 24 and minimize the intrusion of the door 24 towards the vehicle cabin.

A door intrusion resistance apparatus is provided that is discreetly positioned on a door of a vehicle that does not adversely impact the appearance of the door. The door intrusion resistance apparatus does not adversely impact ingress and the egress of vehicle occupants. The door intrusion resistance apparatus utilizes a catcher opening defined by an opening in the rocker assembly for receiving the projection. No hooks, boxes, or other structures protrude from the rocker assembly that can impact the ingress and egress of the vehicle users.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle comprising:
   a door;
   a projection horizontally extending from the door;
   a rocker having a vertical wall defining a catcher opening, wherein the projection is received in the catcher opening when the door is closed; and
   a tang attached to the vertical wall and spaced below the projection, wherein the tang engages the projection in a side impact collision to inhibit intrusion of the door into a vehicle cabin.

2. The vehicle of claim 1, wherein the tang comprises a hook.

3. The vehicle of claim 1, wherein the tang includes an upright portion attached to the vertical wall and a distal end spaced from the vertical wall and that extends from the upright portion.

4. The vehicle of claim 3, wherein the distal end is C-shaped.

5. The vehicle of claim 1, wherein the projection includes a plurality of legs and a cross-piece in between the legs and wherein in a side impact collision, the cross-piece is moved over the tang.

6. The vehicle of claim 1, further comprising a reinforcement panel attached to the vertical wall, the tang being attached to the vertical wall via the reinforcement panel.

7. A vehicle comprising:
   a door;
   a loop horizontally extending from the door;
   a rocker adjacent to the door and having a vertical wall defining a catcher opening, wherein when the door is in a closed position, the loop is received in the catcher opening; and
   a hook inside the rocker and attached to the vertical wall below the catcher opening, wherein in a side impact collision, the loop shifts into engagement with the hook to inhibit the door from intruding into a vehicle cabin.

8. The vehicle of claim 7, wherein the hook includes an upright portion attached to the vertical wall and a plurality of curved portions that are spaced from the vertical wall and extend from the upright portion.

9. The vehicle of claim 7, further comprising a reinforcement panel attached to the vertical wall, the hook being attached to the vertical wall via the reinforcement panel.

10. The vehicle of claim 7, wherein in the side impact collision, the loop deflects downwardly over the hook to control the door and minimize intrusion of the door towards the vehicle cabin.

11. The vehicle of claim 7, wherein the loop includes a plurality of legs and a cross-piece in between the legs and wherein in a side impact collision, the legs and the cross-piece encompass the hook.

12. A door intrusion apparatus for a vehicle having a door and a rocker with a vertical wall defining a catcher opening, the apparatus comprising:
   a loop horizontally extending from the door; and
   a tang attached to the vertical wall below the catcher opening, the tang being spaced from the loop in a normal position, and wherein the tang engages the loop in a side impact collision.

13. The apparatus of claim 12, wherein the tang comprises a hook.

14. The apparatus of claim 12, wherein the loop includes a plurality of legs and a cross-piece in between the legs and wherein in a side impact collision, the legs and the cross-piece encompass the tang.

15. The apparatus of claim 12, wherein the tang includes an upright portion attached to the vertical wall and a plurality of curved portions that are spaced from the vertical wall and that extend from the upright portion.

* * * * *